(12) United States Patent
Michaels et al.

(10) Patent No.: US 9,193,615 B2
(45) Date of Patent: Nov. 24, 2015

(54) PORTABLE BIOFILTER AND DEGASSER

(75) Inventors: James T. Michaels, Bradenton, FL (US); Peter Steinbach, Kallstadt (DE)

(73) Assignee: Mote Marine Laboratory, Sarasota, FL (US)

(*) Notice: Subject to any disclaimer, the term of this patent is extended or adjusted under 35 U.S.C. 154(b) by 287 days.

(21) Appl. No.: 13/595,217

(22) Filed: Aug. 27, 2012

(65) Prior Publication Data

US 2013/0134091 A1    May 30, 2013

Related U.S. Application Data

(60) Provisional application No. 61/527,767, filed on Aug. 26, 2011.

(51) Int. Cl.
| | |
|---|---|
| C02F 3/08 | (2006.01) |
| C02F 3/20 | (2006.01) |
| C02F 3/30 | (2006.01) |
| A01K 63/04 | (2006.01) |
| C02F 101/16 | (2006.01) |
| C02F 103/20 | (2006.01) |

(52) U.S. Cl.
CPC .............. *C02F 3/303* (2013.01); *A01K 63/04* (2013.01); *C02F 3/087* (2013.01); *C02F 3/201* (2013.01); *C02F 2101/16* (2013.01); *C02F 2103/20* (2013.01); *C02F 2203/008* (2013.01); *Y02W 10/15* (2015.05); *Y02W 10/37* (2015.05)

(58) Field of Classification Search
CPC .............. C02F 3/20; C02F 3/201; C02F 3/22; C02F 3/30; C02F 3/303; C02F 3/08; C02F 3/087; C02F 3/085; C02F 2101/16; C02F 2101/163; C02F 2101/166; C02F 2103/20; C01F 2203/00; C01F 2203/006; C01F 2203/008; A01K 63/04; A01K 63/042; Y02W 10/37
See application file for complete search history.

(56) References Cited

U.S. PATENT DOCUMENTS

| | | | | |
|---|---|---|---|---|
| 808,411 | A | * | 12/1905 | Venable .................... 261/110 |
| 5,049,266 | A | * | 9/1991 | Gotz et al. ................ 210/151 |
| 5,126,042 | A | * | 6/1992 | Malone ..................... 210/150 |
| 5,160,460 | A | * | 11/1992 | Goetz et al. .............. 261/122.1 |
| 5,549,828 | A | * | 8/1996 | Ehrlich ..................... 210/602 |
| 5,800,709 | A | * | 9/1998 | Smith ....................... 210/617 |
| 6,100,081 | A | * | 8/2000 | Buelna ..................... 435/266 |
| 6,159,364 | A | * | 12/2000 | Hirane ...................... 210/150 |
| 6,348,147 | B1 | * | 2/2002 | Long ........................ 210/150 |
| 7,244,356 | B2 | * | 7/2007 | Olivier ..................... 210/151 |
| 7,374,683 | B2 | * | 5/2008 | Buelna et al. ............. 210/603 |
| 7,910,001 | B2 | * | 3/2011 | Michaels et al. .......... 210/605 |
| 2008/0017558 | A1 | * | 1/2008 | Pollock et al. ............. 210/90 |

* cited by examiner

*Primary Examiner* — Joseph Drodge
(74) *Attorney, Agent, or Firm* — Foley Hoag LLP

(57) ABSTRACT

The present invention relates to a floating media moving bed portable biofilter and degasser and methods of using same useful for the biological treatment of aqueous nitrogenous waste. Provided herein are enhanced biofilter systems and methods for removing nitrogenous wastes from bodies of water. The portable biofilters described herein remedy the deficiencies of existing biofilters described above due to their enhanced nitrogen removing efficiency coupled with their simple and robust design, relative inexpensiveness, portability, ease of cleaning and maintenance, minimized trapping of aqueous solids, minimization of off-flavors in aquacultured fish, and immediate functionality when transferred to different sources of water. These advantages render the portable biofilters of the present invention suitable for commercial applications for aqueous nitrogenous waste removal.

12 Claims, 4 Drawing Sheets

PORTABLE BIOFILTER AND DEGASSER

RELATED APPLICATIONS

This application claims the benefit of priority to U.S. Provisional Patent Application Ser. No. 61/527,767, filed on Aug. 26, 2011; which is hereby incorporated by reference in its entirety.

BACKGROUND OF THE INVENTION

In response to the ever increasing demand for improved fish growth rates and increased profitability, aquaculture farmers have turned to the use of high-protein fish feeds in large quantities. The use of high-protein feeds, however, leads to the generation of significantly increased amounts of nitrogenous waste (e.g., ammonia) due to the enhanced production of fish excretions (e.g., urea, uric acid, amino acids), organic debris from dead and dying organisms, and uneaten feed. Fish expel the increased nitrogenous waste products through gill diffusion, gill cation exchange, urine, and feces, which must therefore be removed from the aquaculture system. The decomposition of these nitrogenous compounds is particularly important in intensive recirculating aquaculture systems because of toxic effects of ammonia, nitrite, and, to a lesser extent, nitrate.

The process of ammonia removal by a biological filter is called nitrification, which consists of the successive oxidation of ammonia to nitrite ($NO_2^-$) and finally to nitrate ($NO_3^-$). This process is usually actuated by autotrophic bacteria via an aerobic biofilter process. There are many types of biofilters commonly used in aquaculture systems, such as submerged biofilters, trickling biofilters, rotating biological contactors, floating bead biofilters, dynamic bead biofilters, and fluidized-bed biofilters (see, e.g., U.S. Pat. Nos. 4,370,234; 4,620,924; 4,880,549; 5,445,740; 5,593,574; 5,770,080; 6,110,389; 6,617,155; 7,008,539; and 7,082,893; each incorporated herein in its entirety by this reference). However, each such filter is limited to specific applications, such as locations having fixed-position wastewater treatment facilities or having proximity to high-intensity industrial power and pressure sources, because of one or more of the following deficiencies: ineffective removal of ammonia; overproduction of nitrite; large spatial footprints; use of large amounts of power and/or pressure; high cost of operation and/or maintenance; lack of portability; capturing and/or trapping of solids (e.g., particulate matter or debris); enhancement of off-flavors in aquacultured fish; requirement for backwashing; ineffective reduction of supersaturated gas levels in the water; and lack of immediate functionality when transferred across different sources of water.

A biofilter that meets all or even most of these requirements does not currently exist. For example, biofilters using polyethylene moving bed media are commonly used in recirculating aquaculture systems, yet they are susceptible to forming sediment in undisturbed areas within the filter container. This contributes to unwanted off-flavor in fish and other organisms reared in recirculating aquaculture systems. Another disadvantage of existing moving bed biofilters is that they are not portable such that their use is limited to a single body of water. Another disadvantage of existing moving bed biofilters is that they are only effective after aerobic bacterial populations have become established, which is a time-consuming process that can require up to several weeks of bacterial growth.

Accordingly, there is a need in the art for enhanced biofilter systems and methods for removing nitrogenous wastes from bodies of water.

SUMMARY OF THE INVENTION

The present invention relates to a floating media moving bed portable biofilter and degasser and methods of using same useful for the biological treatment of aqueous nitrogenous waste.

Figure 1:
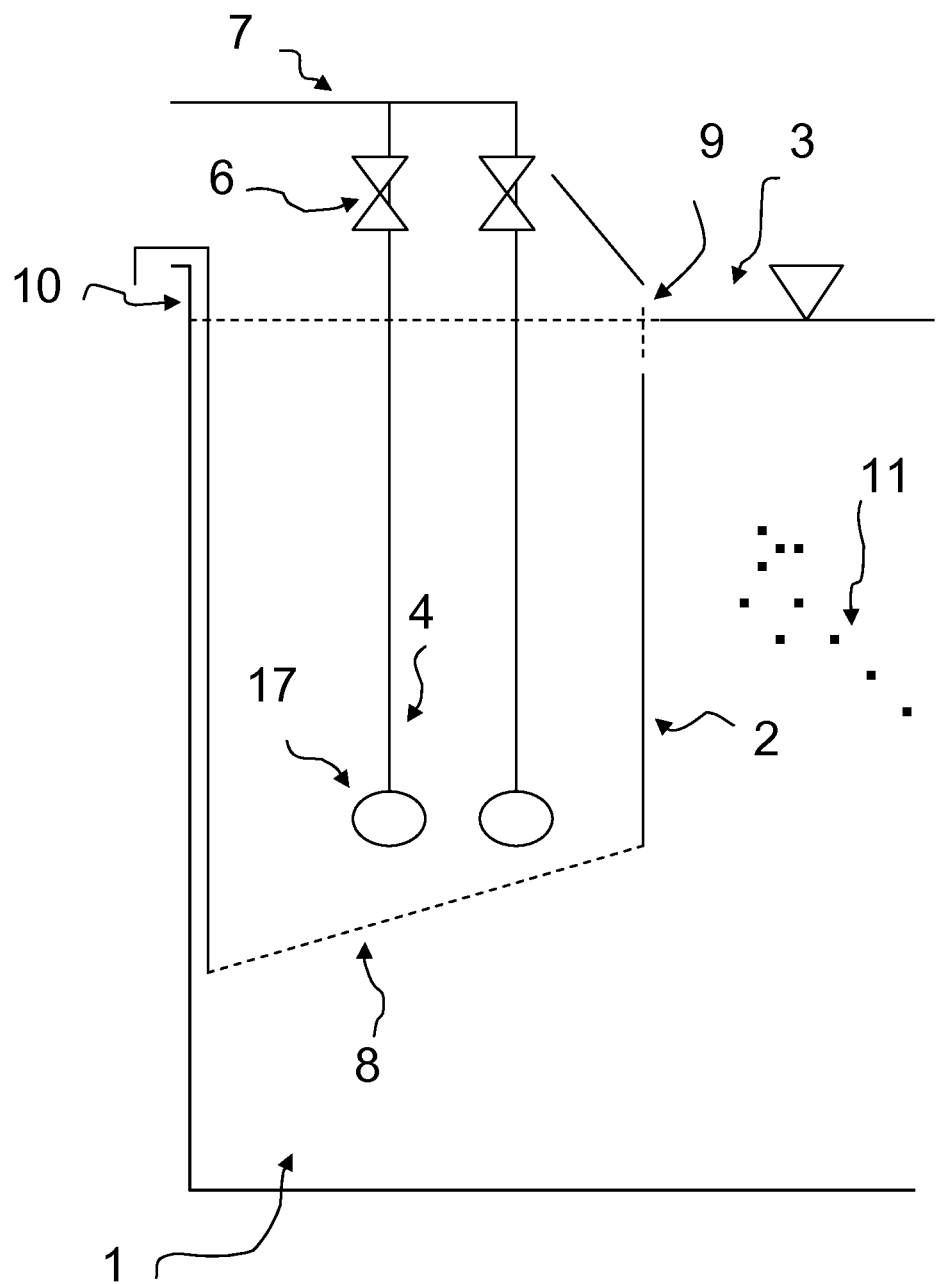
FIG. 1 shows a schematic representation of an embodiment of the floating media moving bed portable biofilter and degasser of the present invention mounted on the side of an aquaculture-rearing tank. The aquaculture-rearing tank (1) can be fitted with a portable biofilter (2) hanging on the rim (10) of the tank. The portable biofilter has mesh openings on the bottom (8) and front (9). The meshing openings on front (9) are at the surface water level (3). Airflow (7) is directed into the tank through air conduits such as pipes or lines and is controlled by valves (6). Air diffuses into water through air line (4) leading to air diffuser head (17), which introduces aeration. Bubbles travel through floating biomedia to the surface water level (3) to maintain circulation within the portable biofilter, supply oxygen to the nitrifying bacteria, and degas supersaturated dissolved gases. Settable solids (11) are not trapped in the portable biofilter (2) and are removed elsewhere using various means.

LIST OF FIGURE IDENTIFYING NUMBERS 1) tank
2) portable biofilter
3) water level in tank 4) air line
5) air holes
6) valve regulator(s) on airflow into tank
7) airflow supply on portable biofilter
8) mesh bottom on portable biofilter
9) mesh opening on front of portable biofilter
10) rim of tank
11) settable solids
12) solid panel
13) lifting eye
14) lid
15) handle
16) support bracket
17) air diffuser head
18) floating biomedia
19) water level in biofilter

DETAILED DESCRIPTION OF THE INVENTION

The present invention relates to a floating media moving bed portable biofilter and degasser and methods of using same useful for the biological treatment of aqueous nitrogenous waste. The portable biofilters described herein remedy the deficiencies of existing biofilters described above due to their enhanced nitrogen removing efficiency coupled with their simple and robust design, relative inexpensiveness, portability, ease of cleaning and maintenance, minimized trapping of aqueous solids (e.g., particulate matter or debris), minimization of off-flavors in aquacultured fish, and immediate functionality when transferred to different sources of water. These advantages render the portable biofilters of the present invention suitable for commercial applications for aqueous nitrogenous waste removal (e.g., projects requiring robust and scalable aqueous nitrification systems).

Generally, the portable biofilters described herein comprise a housing, wherein one or more surfaces of the housing or a portion of said surface or surfaces thereof comprises mesh and is in contact with the body of water allowing water to flow between the housing and the body of water; floating media contained within the housing comprising nitrifying bacteria disposed on the surface of said floating media; and an aeration system, couplable to an air supply system, configured to release air bubbles toward the bottom of the housing such that the air bubbles rise through the floating media to create aerobic conditions for the nitrifying bacteria. In contrast to fixed panel biofilters, air supplied by the aeration system circulates oxygenated water through the floating media, which acts as a substrate for nitrifying bacteria disposed on their surfaces. The floating media has a much higher surface to volume ratio than fixed panel biofilters and therefore more nitrifying capacity per unit volume. In addition, the floating media does not trap solids found in fixed pane biofilters where solids entrapment occurs in quiescent zones. Such entrapment of solids creates anaerobic environments that reduce the nitrifying activity of the nitrifiying bacteria, contributes to the unwanted generation of off-flavors in aquacultured organisms (e.g., fish), and increases the production of unwanted anaerobic by-products, such as hydrogen sulfides.

Although the embodiments of the present invention are depicted and described as used in an aquaculture body of water (e.g., recirculating aquaculture tank; 1), the skilled artisan will recognize that the present invention can be used for the treatment of any body of water requiring removal of unwanted nitrogenous waste (e.g., nitrification). Non-limiting examples of such bodies of water include continuous-flow waste water treatment sites, batch waste water treatment sites, aquaculture tanks, aquariums, ponds, and the like. In some embodiments, the portable biofilters of the present invention can be substantially submerged or completely submerged in the body of water. In other embodiments, substantial and/or complete submergence should be achieved without the bottom of the housing contacting the vessel containing the body of water (e.g., elevated from the floor of the body of water, such as an aquaculture tank) in order to prevent and/or minimize the accumulation and localized trapping of unwanted solids (e.g., organic debris, sludge, and sediments; 11). This open system (e.g., elevating the portable biofilter) bed solves the problem of existing aqueous nitrogenous waste removal designs (e.g., nitrification filter containers), which accumulate unwanted solids inadvertently or by design. This advantage is important because traditional biofilters are closed systems (e.g., having spaces that accumulate unwanted solids), which can promote the growth and accumulation of bacteria and other unwanted materials that, in particular, generate off-flavors in aquacultured organisms.

Figure 2:
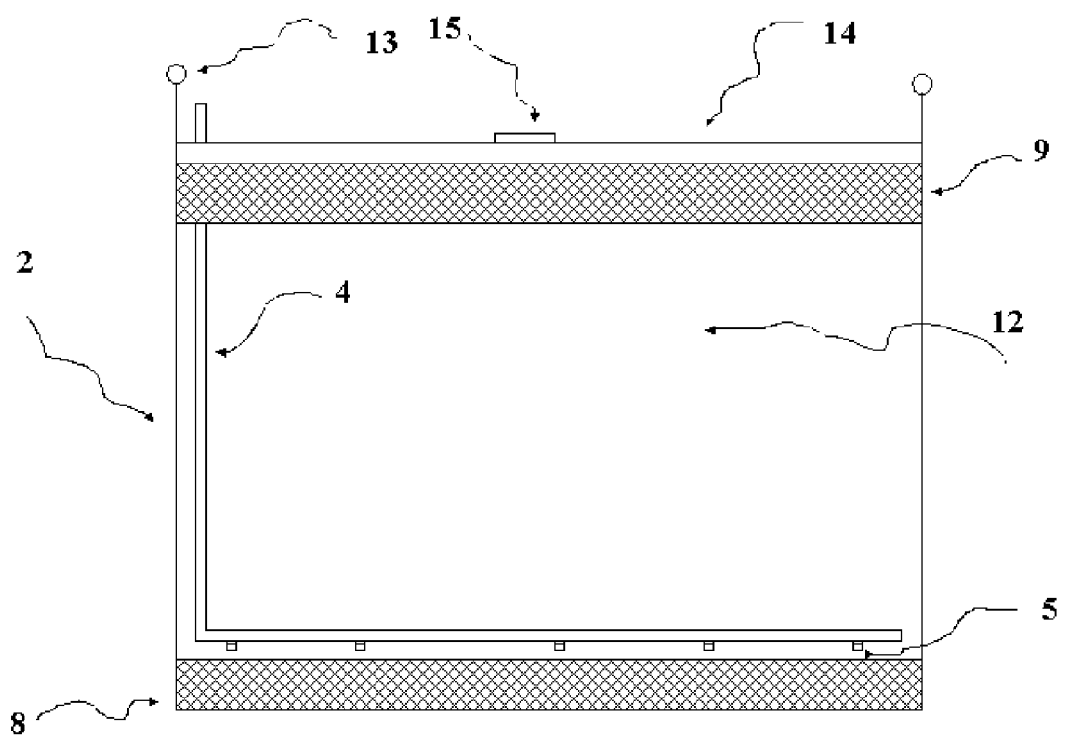
FIG. 2 shows a front view schematic representation of an embodiment of the floating media moving bed portable biofilter and degasser of the present invention. The portable biofilter (2) has a solid panel (12) on both sides, the side oriented towards the wall of the fish tank and on the front in between the screen mesh. Screen mesh to retain biomedia is situated on the front (9) in the area near the water surface and on the bottom (8) of the portable biofilter. A lid (14) with a handle (15) covers the top of the portable biofilter. Air lines (4) direct air into the portable biofilter and through air holes (5) which face downward. Air circulates water and floating biomedia. The portable biofilter has lifting eyes (13) for easy lifting out of the tank.
Figure 3:
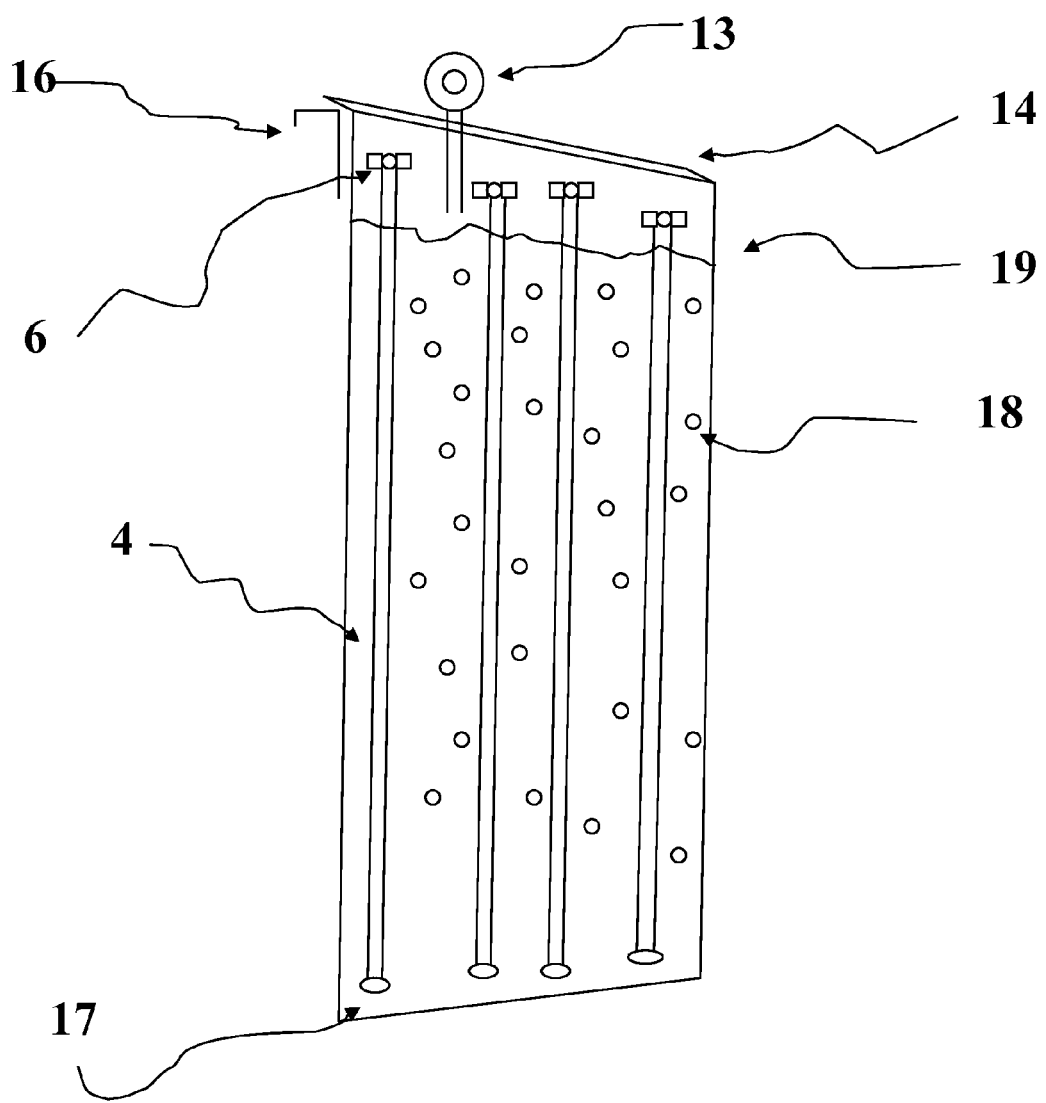
FIG. 3 shows a side view schematic representation of an embodiment of the floating media moving bed portable biofilter and degasser of the present invention with side panel removed. The portable biofilter is supported on the side of the aquaculture-rearing tank by means of a bracket (16). A lifting eye (13) helps lift and move the portable biofilter. An air conduit (4) is used to inject air through air diffuser heads (17). A range of numbers of air lines can be used and depends on the size of the biofilter. Air movement moves the floating biomedia (18) within the housing. The water level in the housing (19) is higher than the water level in the tank because of air movement. A lid (14) covers the top of the housing.

FIGS. 1-3 show the basic structure of one embodiment of the portable filter (2) of the present invention. Although references will be made to the exemplary embodiments illustrated in the figures, no limitation of the scope of the invention is intended and the skilled artisan will appreciate that modifications can be made to the inventive features of the present invention described herein. For example, housings in accordance with the present invention can comprise numerous shapes other than the box illustrated in the Examples, such as spherical, pyramidal, rhomboidal, and other similar shapes. Additional housings can also be designed within the main housing in a nested fashion in order to specify the spatial course of the floating media contained therein.

The housing of the portable biofilter (2) can be constructed out of any suitable substance that is durable in the body of water to be treated. By way of example, a portable biofilter of the present invention can be constructed out of inert metal (e.g., aluminum and stainless steel), plastics (e.g., polyethylene, polypropylene, and polystyrene), concrete, and similar materials that are also capable of resisting corrosion. Surfaces made of such substances are generally solid so as to prevent the flow of water through the surfaces. Such surfaces can also be chosen to be non-toxic to biological organisms living in the body of water to be treated.

By contrast, it is desirable to construct one or more surfaces of the housing out of materials that allow water to pass through the surface in order to enter the portable biofilter for filtration purposes and/or to allow the exit of filtered water (e.g., allowing circulation of water in need of nitrification and post-filtered water between the biofilter and the body of water). As used herein, such a water permeable material is referred to as a mesh. The mesh can additionally prevent organisms larger than the mesh pores from entering the portable biofilter to thereby prevent interference with biofiltration activity. In this respect, modifications to the housing shape itself can facilitate the deflection of organisms from entering the portable biofilter. In one embodiment, the bottom of the portable biofilter can be angled (e.g., about 1°, 2°, 3°, 4°, 5°, 6°, 7°, 8°, 9°, 10°, 11°, 12°, 13°, 14°, 15°, 16°, 17°, 18°, 19°, 20°, or more degrees from the horizontal) to the sides of the portable biofilter in order to deflect biological organisms living in the body of water (e.g., fish) that accidentally encounter the portable biofilter. Accordingly, the mesh pores should be large enough to allow for water permeability and flow, but can otherwise be engineered or designed to retain the floating biomedia within the housing depending on the dimensions of the particular biomedia used and prevent the entrance of any unwanted biological organisms. In some embodiments, any mesh material suitable for such purposes can be used (e.g., stainless steel mesh such as one-quarter inch #18 flattened expanded metal, nylon mesh, plastic mesh, etc.). For example, the housing can be a box in which one or more of the top, front, back, side, and bottom surfaces or a portion of said surface or surfaces thereof is comprised of mesh and the non-mesh surfaces comprise solid panels. In one embodiment, FIG. 2 shows a portable biofilter, wherein the front, back, and side surfaces of the box comprise solid panels (12) and the bottom surface of the box comprises mesh (8). A skilled artisan will appreciate that the dimensions of the solid and/or meshed surfaces of the housing can be designed to create patterns of water blockage or flow, respectively, between the body of water and the portable biofilter. Decreasing the height of the solid surfaces of the housing, for example, will increase the net inflow and/or outflow of water through the portable biofilter. In addition, surfaces can comprise both solid (e.g., non-permeable to water) and meshed or otherwise porous (e.g., permeable to water) to further control the circulation of water through the portable biofilter.

In other embodiments, the body of water has a border between air and water (3 and 19; also referred to as a water level) and one or more of the top, front, back, side, and bottom surfaces of the housing or a portion of said surface or surfaces of the housing thereof comprised of mesh contacts an air-water border. In some embodiments, the air-water border is that between air and the water inside the portable biofilter (i.e., the water to be filtered and/or water that is filtered. In other embodiments, the air-water border is that between air and the water outside the portable biofilter (i.e., the body of water generally). Aeration within the housing of some forms of portable biofilters described herein can force the water within the housing to be higher than that outside of the housing. FIG. 2 shows a portable biofilter, wherein the back, and side surfaces of the housing comprise solid panels, the bottom surface of the box or portion thereof comprises mesh, and the front surface comprises a solid panel below the air-water border and mesh at and above the air-water border. In such an embodiment, unfiltered water is circulated through the portable biofilter in a directional manner from the bottom mesh and filtered water exits through the meshed surfaces at the water level line.

In addition to the housings described herein, the portable biofilters of the present invention use an aeration system to float media (18) bed within the housing used as a substrate for nitrifying bacteria. One or more air conduits (4; shown as air lines for illustration purposes) are couplable to an air supply system and extend into the housing of the portable biofilter. The number and spatial arrangement of air conduits depends on the size and dimensions of the particular portable biofilter. Each air conduit is configured to release air bubbles toward the bottom of the housing such that the air bubbles rise through the floating media to create aerobic conditions for the nitrifying bacteria disposed thereon. In some embodiments, the air conduit configuration comprises one or more openings for allowing air bubbles to escape therefrom (5). For example, the one or more openings are at the bottom most extremity of the air conduit. Physical characteristics of the bubbles, such as the rate of formation and size, can be manipulated according to a number of art-recognized methods. For example, an air diffuser head (17) can be present at the end of each air conduit that determines the size and rate of the air bubbles formed. In some embodiments, the air bubbles can have diameters of about 0.1 mm, 0.5 mm, 1 mm, 1.5 mm, 2.0 mm, 2.5 mm, 3.0 mm, 3.5 mm, 4.0 mm, 4.5 mm, 5.0 mm, or larger or any range in between. Air diffuser compositions are well known in the art and can be, for example, porous material (e.g., gauze, sponge, and the like), optionally, placed in between layers of water impermeable material, so as to cause air flow resistance and emission of bubbles having a size dependent on the interaction between the air flow resistance and porous material. In addition, valves (6) can be used to regulate and/or customize the air volume and rate provided by the air supply system to each air conduit. The aeration system can therefore be customized to supply the floating media and nitrifying bacteria disposed thereon with a continuous stream of oxygenated air. This diffusion of air in the portable biofilter of the present invention functions as a degasser to reduce supersaturated gas levels in the water. The partial pressure of the gases in the water will attempt to reach equilibrium with the partial pressure of the gases in the diffused air resulting in a net transfer of supersaturated gases from the water to the diffused air. In addition, the aeration system supplies the floating media and nitrifying bacteria disposed thereon with a continuous stream of circulating water to enhance nutrient flow.

The housings and aeration systems described herein contain and support floating media beds as a substrate for nitrifying bacteria. By contrast, almost all existing recirculating aquaculture systems use fixed-film biofilters where the nitrifying bacteria grow on either a wet or submerged media surface. The nitrogenous waste filtration capacity of biological filters largely depends on the total surface area available for biological growth of the nitrifying bacteria. Typical media used in aquaculture biofilters are sand, crushed rock or river gravel, or some form of plastic or ceramic material shaped as small beads, or large spheres, rings, saddles, or panels.

Floating media for use in the present invention can be, for example, AMB BIOMEDIA (EEC, North America, LLC). Air introduced into the portable biofilter from the aeration system creates an air- and water-lift within the portable biofilter that agitates the floating biomedia and keeps it suspended and circulating within the portable biofilter. A skilled artisan will appreciate that the buoyancy and specific gravity of the floating media and the mass of supported nitrifying bacteria, are factors affecting the aeration parameters required to allow the media to remain suspended in the water column without settling at the bottom of the housing. Manipulations to the air supply, air conduits, air diffusers, floating media compositions and shapes, and the like can be made by a skilled artisan to determine the desired circulation and floating characteristics of the media within the housing. In addition, a variety of naturally occurring nitrifying bacteria exist in the environment and are suitable for use with the portable biofilters of the present invention (e.g., bacteria from the genera *Nitrosomonas* and *Nitrobacter*). For example, various species of *Nitrobacter agilis* exist in the wild and will grow on the portable biofilter such that a naturally occurring nitrifying process is enhanced. Alternatively, recombinantly engineered nitrifying bacteria can also be used.

In addition to the housing, floating media, and aeration system elements of the portable biofilters of the present invention, several additional elements can be added to further enhance the utility of such portable biofilters. In particular, these additional elements enhance the portable biofilters' portability, which is an important advantage for at least several reasons. First, the portable biofilters of the present invention are economical because the same system can be transported and used across several bodies of water without incurring capital costs associated with more permanent biofiltration systems individualized for each body of water. Second, they are immediately functional and effective at removing nitrogenous wastes when transferred to a different body of water because the floating media continues to maintain nitrifying bacteria without the need for a time consuming nitrifying bacterial startup process. Third, portable biofilters can be easily and temporarily removed from the body of water so that the body of water itself can be manipulated, such as via cleaning, disinfecting, pressure-washing, and the like.

As discussed above, the housing dimensions can be engineered in a number of ways and therefore some embodiments can have housings that are relatively narrow and wide so as to provide a large volume for nitrification activity, while minimizing the spatial footprint of the portable biofilter in the body of water. For example, this maximizes the effective unimpeded habitable space of organisms living therein (e.g., fish). The portable biofilters of the present invention also do not consume any floor space of the body of water. Such engineered form factors are further amenable to portability as they can be sequestered next to the edge of the body of water, such as through an attachment means (e.g., hooks, screws, clamps, rivets, nails, pins, adhesives such as tape or glue or velcro or suction cups, controlled flotation devices, magnets, or other methods known in the art that are useful for attaching items together). In one embodiment, a supporting bracket or hook (16) on the portable biofilter can be used to hang the portable biofilter at the rim (10) or other edge of a body of water, such as that of an aquaculture tank (1).

In other embodiments, the portable biofilters of the present invention can further comprise a means for shielding the floating media from light. For example, sunlight can both inhibit the growth and activity of nitrifying bacteria, as well as promote the growth of unwanted organisms, such as algae. The means for shielding the floating media from light can be a lid that covers the housing, a floating cover, configuration of nested housings, or the like that reduces or prevents sunlight from reaching the submerged floating media.

In another aspect, the present invention provides methods for nitrifying a body of water using the portable biofilters described herein. In some embodiments, the method involves coupling the aeration system of a portable biofilter described herein to an air supply system, contacting the portable biofilter with the body of water, and using the aeration system to create and release air bubbles toward the bottom of the housing such that the air bubbles rise through the floating media to create aerobic conditions for the nitrifying bacteria to nitrify the body of water. In other embodiments, the order of aeration system coupling and body of water contacting steps are reversed. In still other embodiments, the method further comprises the step of shielding the floating media from light.

EXEMPLIFICATION

This invention is further illustrated by the following examples, which should not be construed as limiting.

Example 1

Hydraulic Testing of a Portable Biofilter and Degasser

A prototype filter measuring 91.44 cm in length by 40.64 cm wide by 91.44 cm deep (front), 96.52 cm deep (back) was constructed using a ⅛ inch thick, #304 stainless steel angle to construct the frame, flattened Type 304, ¼ inch, #18 expanded stainless steel to construct the mesh openings, and ½ inch polyethylene sheeting to construct the solid sides and lid. Air plumbing was constructed using 12.7 mm diameter schedule 40 PVC pipe and fittings. Four parallel air supply lines with individual valves for air flow control were installed. Air was supplied to the biofilter via a regenerative air blower. The portable biofilter was attached to a wall of a tank that allowed the filter to have 30.48 cm of freeboard above the water surface.

The biofilter was filled with approximately 0.14 m³ of AMB polyethylene floating media which equates to a 60% fill rate of the submerged portion of the biofilter. Air was supplied to the filter via various iterations of the 4 parallel air diffusers. Air induced water flow through the biofilter was accomplished with any combination of 1-4 air diffusers operating. Good biomedia movement was observed when one or two diffusers were operating. Biomedia movement was hindered when 3 or all 4 of the diffusers were supplying air to the biofilter. This test confirmed that for this particular configuration of filter, two air diffuser systems were sufficient for proper operation and sufficient air to both move water through the biofilter and adequately stir the biomedia.

Example 2

Degassing Testing of a Portable Biofilter and Degasser

The biofilter described in Example 1 was then moved into a 31 m³ fish production tank that had a fish stocking density of approximately 60 kg/m³ and a daily feeding rate of approximately 6 kgs/day. Water temperature was 18.9 degrees Centigrade. This production tank was prone to slight oxygen supersaturation levels due to the less-than-optimal oxygenation support systems. Once this biofilter was installed in this production tank, the supersaturation levels within the tank were reduced by approximately 0.5 ppm due to the turbulence induced by the air injection into the biofilter. This indicates that the turbulence produced by this biofilter will both reduce supersaturated gas conditions and supplement oxygenation of an unsaturated system.

Example 3

Figure 4:
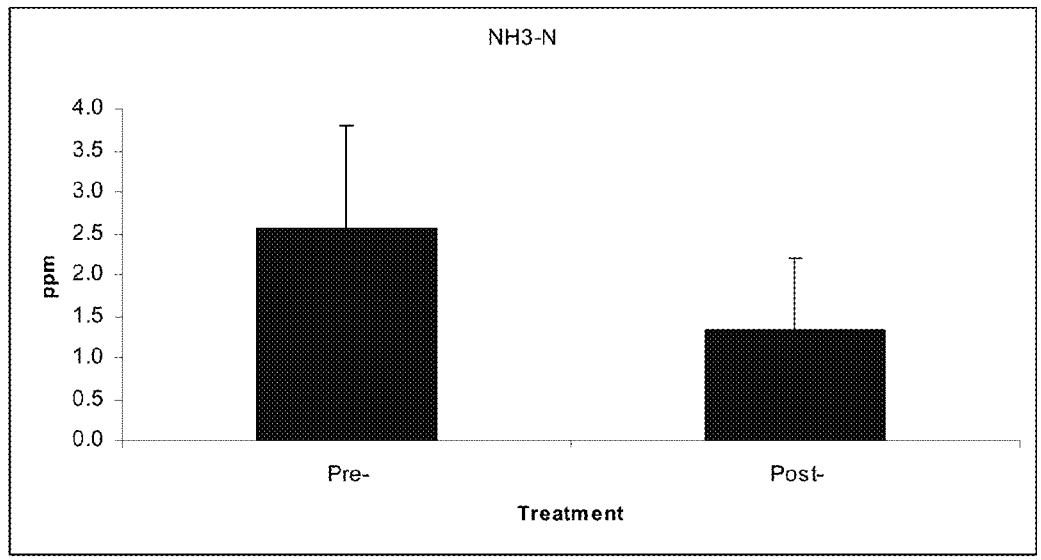
FIG. 4 shows reduction in $NH_3$ concentrations between water in a fish tank and the fish tank water exiting a portable biofilter and degasser of the present invention.
Figure 5:
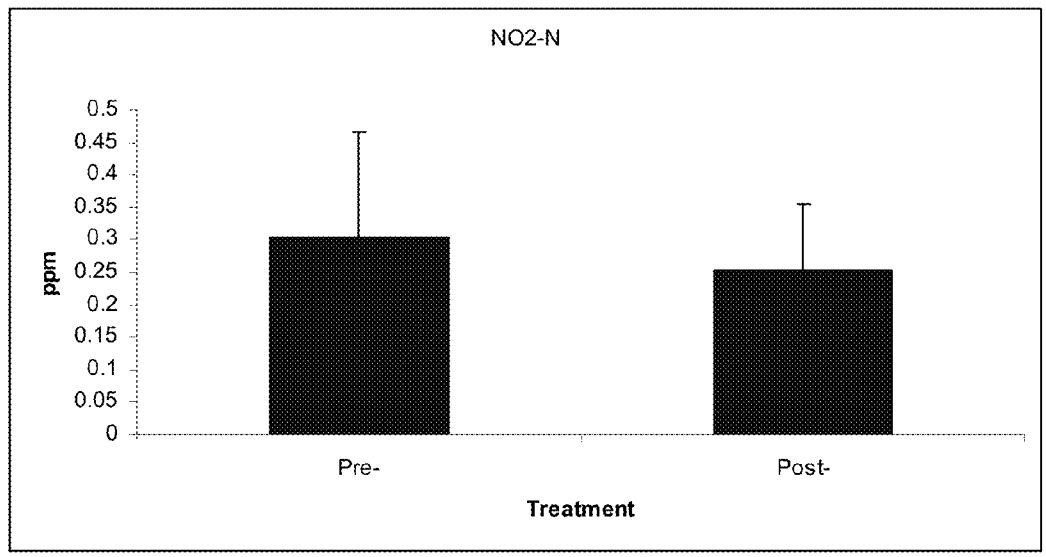
FIG. 5 shows reduction in $NO_2$ concentrations between water in a fish tank and the fish tank water exiting a portable biofilter and degasser of the present invention.

Reduction in $NH_3$ and $NO_2$ Concentrations Using a Portable Biofilter and Degasser The biofilter was left in the above stated 31 m³ fish production tank for a period of 4 weeks to allow the nitrifying bacterial populations to seed and stabilize on the filters biomedia. Once this bacterial stabilization was achieved, $NH_3$—N, $NO_2$—N, and $NO_3$ measurements were taken in the production tank and at the discharge of the biofilter to confirm that nitrification was occurring. Reductions in $NH_3$—N, $NO_2$—N and increases in $NO_3$ as the water passed through the biofilter confirmed that nitrification was occurring. FIGS. 4 and 5 confirm a reduction in $NH_3$ and $NO_2$ concentrations between water in a fish tank generally and the fish tank water exiting a portable biofilter and degasser of the present invention, with FIG. 4 demonstrating a reduction in $NH_3$ concentration (parts per million; ppm; one pass through biofilter; n=4) and FIG. 5 demonstrating a reduction in $NO_2$ concentrations (parts per million; ppm; one pass through biofilter). Rapid water exchange occurred through the biofilter. With regard to portable efficacy, data were measured just after a "seeded biofilter" was transferred to a new fish tank, thus demonstrating that the filter did not require a start-up process.

Example 4

Production Testing of a Portable Biofilter and Degasser

Once the nitrification ability of the portable biofilters described in Examples 1-3 was confirmed, several more units were constructed and placed into service throughout the fish production operation. Repeated testing over the next 12 to 24 months confirmed the robustness in the design, the ease of operation and lack of disruption in nitrification capacity as these units were moved from tank to tank, and their ability to mitigate supersaturated oxygen conditions.

INCORPORATION BY REFERENCE

The contents of all references, patent applications, patents, and published patent applications, as well as the Figures, cited throughout this application are hereby incorporated by reference.

EQUIVALENTS

Those skilled in the art will recognize, or be able to ascertain using no more than routine experimentation, many equivalents to the specific embodiments of the invention described herein. Such equivalents are intended to be encompassed by the following claims. In addition, alterations and further modifications of the inventive features illustrated herein, and additional applications of the principles of the inventions as illustrated herein, which would occur to one skilled in the relevant art and having possession of this disclosure, are to be considered within the scope of the invention.

What is claimed:

1. A portable moving bed biofilter for nitrifying a body of water, comprising:
   (a) a housing, wherein said housing comprises a box, said box comprises top, front, back, side, and bottom surfaces, wherein the back and side surfaces comprise solid panels, the bottom surface or a portion thereof is a non-horizontal surface comprising mesh, and the front surface comprises a solid panel below the air-water border and mesh at and above the air-water border, wherein the air-water border is the interface between the air and water to be filtered or water that is filtered,
   said housing is in contact with the body of water allowing water to flow between the housing and the body of water, but does not contact the bottom of the body of water;
   (b) floating media contained within the housing comprising nitrifying bacteria disposed on the surface of said floating media; and
   (c) an aeration system comprising parallel air conduits, couplable to an air supply system, configured to release air bubbles toward the bottom of the housing such that the air bubbles rise through the floating media to create aerobic conditions for the nitrifying bacteria.

2. The portable moving bed biofilter of claim 1, wherein the housing further comprises an attachment means selected from the group consisting of hook, screw, clamp, rivet, nail, pin, tape, glue, velcro, suction cup, controlled flotation device, magnet, and combinations thereof.

3. The portable moving bed biofilter of claim 1, wherein the body of water comprises water selected from the group consisting of waste water, uncirculated aquaculture water, recirculated aquaculture water, aquarium water, natural ponds, and man-made ponds.

4. The portable moving bed biofilter of claim 1, further comprising a lid that covers the housing, a floating cover, or a configuration of nested housings for shielding the floating media from light.

5. The portable moving bed biofilter of claim 1, wherein the aeration system comprises one or more parallel air conduits each of which is disposed toward the bottom of the housing and each of which has one or more openings for allowing air bubbles to escape therefrom.

6. The portable moving bed biofilter of claim 5, wherein the one or more openings are at the bottom most extremity of the air conduit.

7. The portable moving bed biofilter of claim 5, wherein the one or more air conduits are capped with an air diffuser.

8. The portable moving bed biofilter of claim 1, wherein the non-horizontal surface is angled 1°, 2°, 3°, 4°, 5°, 6°, 7°, 8°, 9°, 10°, 11°, 12°, 13°, 14°, 15°, 16°, 17°, 18°, 19°, or 20° from the horizontal.

9. A method for nitrifying a body of water, comprising:
   (a) coupling the aeration system of the portable moving bed biofilter of claim 1 to an air supply system;
   (b) contacting the portable moving bed biofilter with the body of water; and
   (c) using the aeration system to create and release air bubbles toward the bottom of the housing such that the air bubbles rise through the floating media to create aerobic conditions for the nitrifying bacteria to nitrify the body of water.

10. The method of claim 9, further comprising the step of shielding the floating media from light.

11. The method of claim 9, wherein step (b) is performed prior to step (a).

12. The method of claim 11, further comprising the step of shielding the floating media from light.

* * * * *